United States Patent
Dietz et al.

(10) Patent No.: US 7,581,442 B1
(45) Date of Patent: Sep. 1, 2009

(54) OPTICALLY MONITORING FULLNESS OF FLUID CONTAINER

(75) Inventors: Paul Dietz, Redmond, WA (US); Benjamin David Eidelson, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 23 days.

(21) Appl. No.: 12/042,303

(22) Filed: Mar. 4, 2008

(51) Int. Cl.
 *G01F 23/00* (2006.01)
(52) U.S. Cl. ........................................ 73/293; 73/290 R
(58) Field of Classification Search ................ 73/293, 73/290 R
See application file for complete search history.

(56) References Cited

U.S. PATENT DOCUMENTS

| | | | |
|---|---|---|---|
| 2,566,789 A * | 9/1951 | Blackinton et al. | 359/440 |
| 3,242,794 A * | 3/1966 | Crane | 250/577 |
| 4,745,293 A | 5/1988 | Christensen | |
| 4,809,551 A * | 3/1989 | Grossiord | 73/327 |
| 5,381,022 A | 1/1995 | Nemeth et al. | |
| 6,172,377 B1 | 1/2001 | Weiss | |
| 6,173,609 B1 | 1/2001 | Modlin et al. | |
| 6,546,795 B1 | 4/2003 | Dietz | |
| 6,921,911 B2 | 7/2005 | Siepmann | |
| 2003/0086824 A1* | 5/2003 | Sasaki et al. | 422/82.09 |
| 2006/0199260 A1* | 9/2006 | Zhang et al. | 435/293.1 |
| 2007/0220444 A1 | 9/2007 | Sunday et al. | |

OTHER PUBLICATIONS

Kim, et al., "HCI (Human Computer Interaction) Using Multi-touch Tabletop Display", PACRIM'07, IEEE, 2007, pp. 391-394.
"The Weight Table", retrieved on Dec. 31, 2007, at << http://eis.comp.lancs.ac.uk/smart-its/Weight_Table/weight_table.html >>, pp. 1-3.
"Microsoft Surface: Your NextGen Table Top?", Technizzel, 2007, pp. 1-3.
"Eureka: Multi-Touch Illuminate Table", Jun. 2007, p. 1.
"Virtual Factory on the Tabletop", Dec. 14, 2007, ScienceDaily LLC, 1995-2007, pp. 1-2.
Izadi, et al., "ThinSight: Integrated Optical Multi-touch Sensing through Thin Form-factor Displays", Proceedings of the 2007 workshop on Emerging displays technologies. vol. 252, ACM 2007, pp. 4.
"Gems Sensors & Controls Spotlight", Gems Sensors & Controls, 2006, p. 1.
"iGlassware", Mitsubishi Electric Research Laboratories, 2007, p. 1.

* cited by examiner

*Primary Examiner*—Hezron Williams
*Assistant Examiner*—Rodney T Frank
(74) *Attorney, Agent, or Firm*—Alleman Hall McCoy Russell & Tuttle LLP

(57) ABSTRACT

A relative fullness of a fluid container is monitored by directing reference light at a bottom surface of the fluid container. The fluid container is designed so that the amount or pattern of reference light reflected from the fluid container varies in relation to the relative fullness of the fluid container. Accordingly, the relative amount or pattern of reference light reflected from the fluid container can be monitored and used to determine the relative fullness of the fluid container.

20 Claims, 7 Drawing Sheets

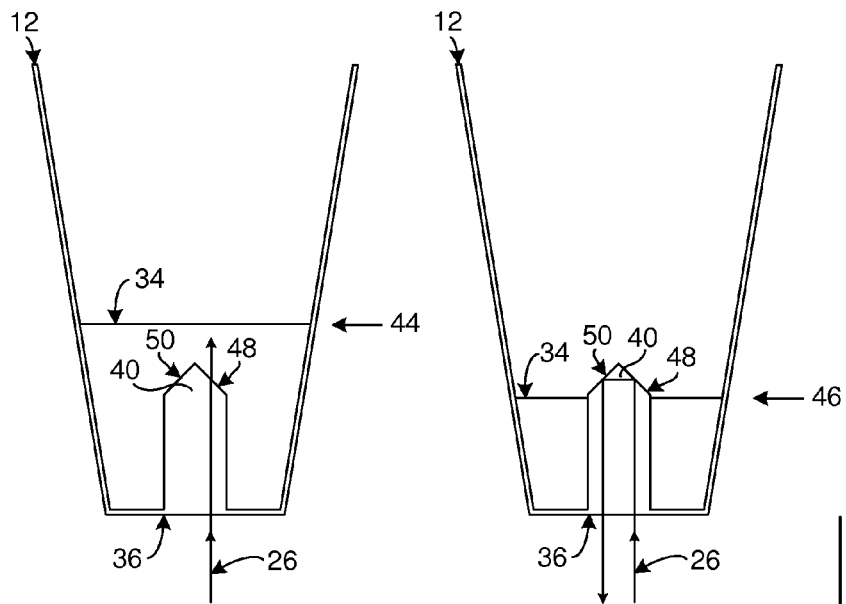
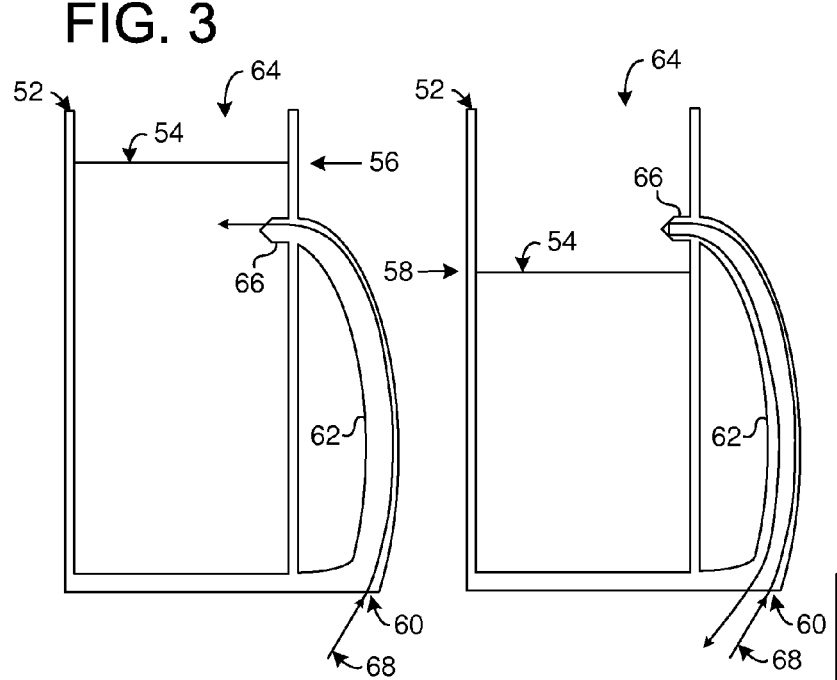

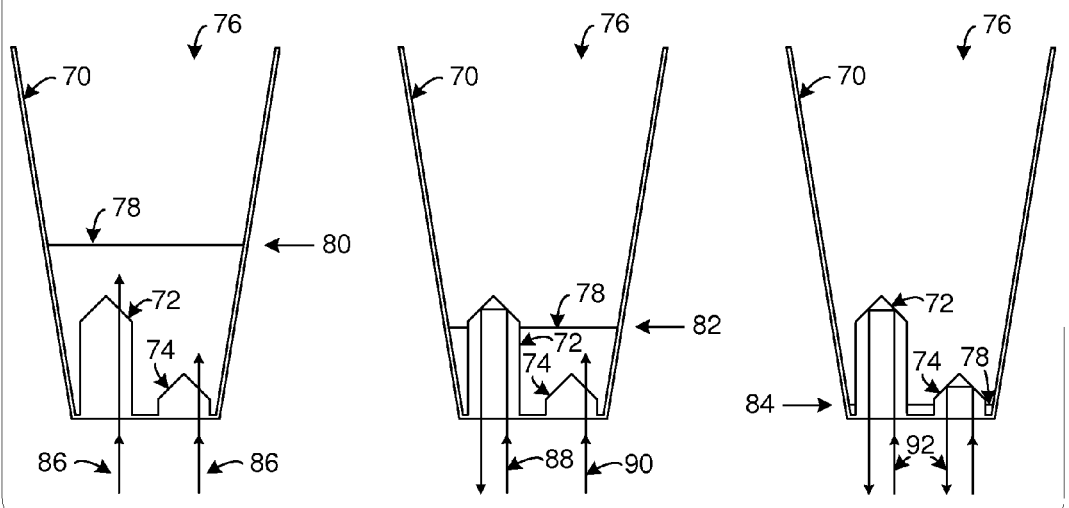
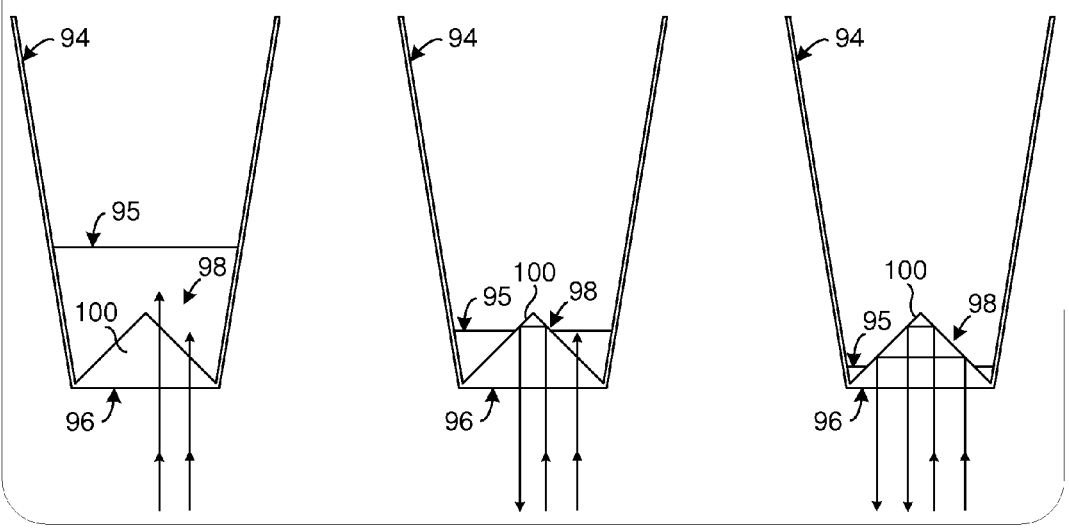
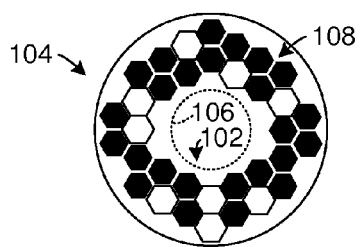 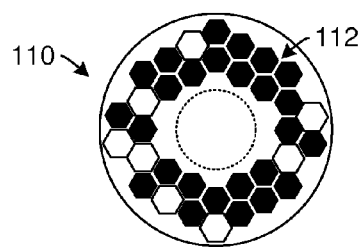

OPTICALLY MONITORING FULLNESS OF FLUID CONTAINER

BACKGROUND

A variety of technologies exist for measuring the relative fullness of a fluid container. For example, a dipstick can be physically dipped into a fluid container to determine the fluid level of the container. As another example, a float may be connected to a variable resistor that changes resistance as the float moves with the changing fluid level in the fluid container. As still another example, a fluid container, such as a measuring cup, may include a series of calibrated markings arranged along a sidewall of the fluid container, and the markings can correspond to the volume of fluid in the fluid container.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The relative fullness of a fluid container can be optically monitored. In particular, reference light can be directed at a bottom surface of the fluid container. The fluid container can be designed so that it varies the amount or pattern of reflected reference light in relation to the relative fullness of the fluid container. Accordingly, the relative amount or pattern of reference light reflected from the fluid container can be measured and correlated to the relative fullness of the fluid container.

BRIEF DESCRIPTION OF THE DRAWINGS

FIG. 2 shows an example fluid container in accordance with an embodiment of the present disclosure.

FIG. 3 shows another example fluid container in accordance with an embodiment of the present disclosure.

FIG. 4 shows another example fluid container in accordance with an embodiment of the present disclosure.

FIG. 5 shows another example fluid container in accordance with an embodiment of the present disclosure.

FIG. 6 shows an example reflective identification-pattern on a bottom surface of a fluid container in accordance with an embodiment of the present disclosure.

FIG. 7 shows another example reflective identification-pattern on a bottom surface of a fluid container in accordance with an embodiment of the present disclosure.

DETAILED DESCRIPTION

Figure 1:
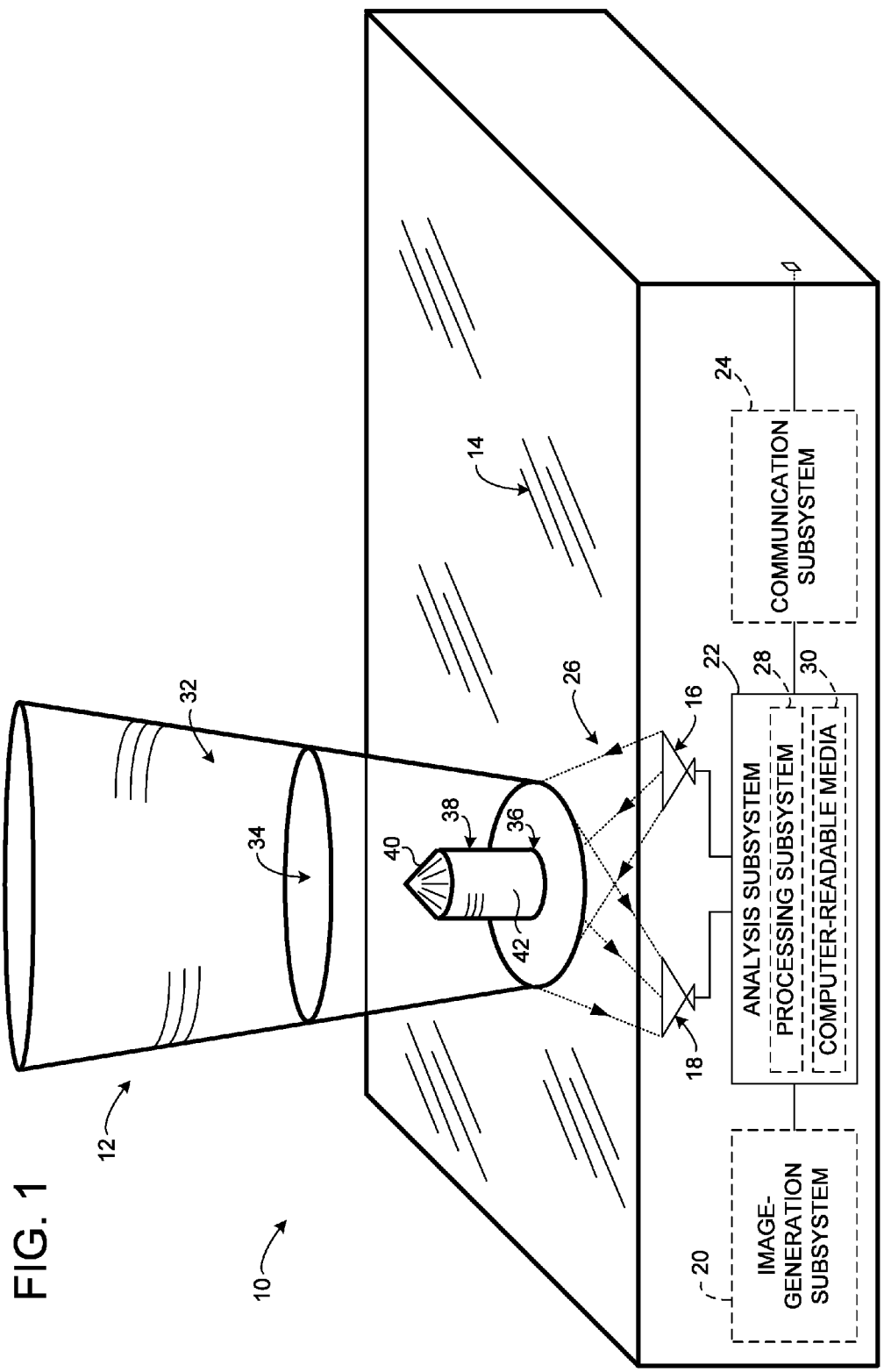
FIG. 1 shows a fluid-monitoring system for monitoring a relative fullness of a fluid container in accordance with an embodiment of the present disclosure.

FIG. 1 shows a nonlimiting example of a fluid-monitoring system 10 and fluid container 12. As described in more detail below, fluid-monitoring system 10 can optically monitor a relative fullness of fluid container 12 by directing reference light at a bottom surface of the fluid container and measuring a relative amount or pattern of reference light reflected from the fluid container. The amount or pattern of reflected reference light changes based on the fullness of the fluid container. Therefore, the relative amount or pattern of reference light reflected from the fluid container can be correlated with a relative fullness of the fluid container.

Fluid-monitoring system 10 includes a surface 14, a light source 16, a sensor 18, an image-generation subsystem 20, an analysis subsystem 22, and a communication subsystem 24.

Surface 14 is orientated to support fluid container 12. For example, surface 14 may be a tabletop, a bar top, a countertop, a dining table, a café table, a shelf, or virtually any other surface capable of supporting a fluid container. The surface may be orientated substantially horizontally, although other orientations are possible. While shown as a substantially planar surface, non-planar surfaces also may be used.

The size of a surface can be varied tremendously. For example, a surface may be sized to support a single fluid container, or a surface may be sized to support a plurality of different fluid containers.

Surface 14 may optionally be a display surface capable of presenting static or dynamic images. As a nonlimiting example, surface 14 may be a light-transmissive rear projection screen capable of presenting images projected from behind the surface. The fluid-monitoring system may utilize image-generation subsystem 20 for projecting images onto surface 14. In such embodiments, surface 14 may include a clear glass or plastic layer, one or more diffusion layers, and/or an at least partially colored, tinted, or opaque layer. In some embodiments, surface 14 may not have any display functionality.

Light source 16 is positioned to direct reference light 26 at fluid container 12 from behind surface 14. In other words, reference light travels through surface 14 before reaching fluid container 12.

Light source 16 may project any suitable wavelength, including but not limited to infrared and visible wavelengths. The reference light projected from light source 16 may have a single wavelength or may be comprised of two or more different wavelengths. While light source 16 is illustrated as a single device, a plurality of different devices may be cooperatively used to project the reference light. Further, while light source 16 is illustrated as being located substantially directly below surface 14, a light source may additionally or alternatively be located at one or more sides of surface 14, or at virtually any other suitable position. Embodiments that include an image-generation subsystem may optionally utilize light source 16 to generate light for projecting images onto surface 14.

Sensor 18 can detect reference light that is reflected from fluid container 12. The sensor is operatively positioned behind surface 14. In other words, reference light reflected from fluid container 12 travels through surface 14 before reaching sensor 18.

In many conditions, a high percentage of reference light projected by light source 16 is transmitted through surface 14 without being reflected. However, an object at or near the surface may reflect the reference light. Reflected reference light may be detected by sensor 18. In some embodiments, sensor 18 may be able to identify a position of an object at or near surface 14 based on the location from which reference light reflects.

The properties of an object can affect how much reference light is reflected by the object. As a nonlimiting example, an opaque object touching the surface may reflect a relatively high percentage of reference light back to the sensor, while a transparent object touching the surface may transmit a relatively high percentage of the reference light without reflecting the reference light to the sensor.

As described in more detail below, fluid container 12 can be configured to reflect two or more different relative amounts or patterns of reference light based on a relative fullness of the fluid container. In other words, the fluid container may reflect relatively more reference light when full than when empty, or vice versa. As a result, the amount or pattern of reflected light can be measured to determine a relative fullness of the fluid container.

While sensor 18 is illustrated as a single device, a plurality of different devices may be cooperatively used to measure reflected reference light. Further, while sensor 18 is illustrated as being located substantially directly below surface 14, a sensor may additionally or alternatively be located at one or more sides of surface 14, or at virtually any other suitable position.

By positioning both light source 16 and sensor 18 behind surface 14, the fluid-monitoring system can serve as an unobtrusive device well suited for incorporation into a variety of different usage environments. Additionally, neither the light source nor the sensor physically interfere with use of the surface, as both are substantially hidden behind the surface. In some embodiments, an area behind the surface can be at least partially environmentally sealed, thus providing protection to the light source, sensor, and other components located behind the surface. Such protection may lessen potential damage that could be caused by spilled contents of the fluid container.

While described above in the context of monitoring a relative fullness of a single fluid container, it should be understood that a plurality of different fluid containers may be monitored by the same fluid-monitoring system and/or by a plurality of different fluid-monitoring systems cooperating with one another.

Communication subsystem 24 may include one or more wired or wireless interfaces for communicating with other devices. As nonlimiting examples, and as described in more detail below, the communication subsystem can send messages relating to a relative fullness of a fluid container or an identity of a fluid container. Such messages may be sent to any suitable message recipient, such as a computer that tracks beverage sales and service at a bar or restaurant. The communication subsystem may send messages via IEEE 802.11x, IEEE 802.15.x, IEEE 802.3, or other suitable communication technologies, in virtually any suitable format.

Analysis subsystem 22 can include analog and/or digital components for determining a relative fullness of the fluid container. In particular, the analysis subsystem can analyze a relative amount or pattern of reference light reflected from a fluid container, as measured by sensor 18. Such analysis may include correlating the relative amount or pattern of reference light reflected from the fluid container with a relative fullness of the fluid container. To facilitate such a correlation, the analysis subsystem may be preconfigured to recognize certain magnitudes of reflected light, certain patterns of reflected light, and/or other characteristics of reflected light as corresponding with a particular fullness of a fluid container. The analysis subsystem may utilize one or more lookup tables or other such data structures for correlating a relative amount or pattern of reflected light with a relative fullness of a fluid container.

The analysis subsystem may optionally include a processing subsystem 28 and computer-readable media 30. The processing subsystem may include one or more general processing units, application specific integrated circuits, or other devices capable of performing logical operations. The computer-readable media may include one or more volatile and/or nonvolatile memory devices for storing and/or temporarily holding instructions that can be executed by the processing subsystem to perform logical operations defined by the instructions. In other words, the computer-readable media may include instructions, that when executed by the processing subsystem, perform one or more routines that assist in the optical monitoring of one or more fluid containers. As a nonlimiting example, the computer-readable media may include instructions that correlate a relative amount or pattern of reference light reflected from a fluid container with a relative fullness of the fluid container.

The herein described instructions may include source code instructions, object code instructions, machine code instructions, system-level software instructions, application-level software instructions, instructions embedded in firmware, instructions embedded in hardware, or virtually any other type of executable instructions.

In some embodiments, a portion (i.e., some to all) of the processing subsystem and/or the computer readable media may be remotely located relative to surface 14. As such, some of the instructions may be stored, temporarily held, and/or executed remotely.

Fluid container 12 defines a fluid-holding space 32 for holding a fluid. In the illustrated embodiment, fluid container 12 is a pint glass, and fluid-holding space 32 is partially filled with a clear liquid 34, such as water. Liquid 34 may be referred to as a test fluid, because fluid container 12 and fluid-monitoring system 10 are cooperatively configured to test the level of the liquid within the fluid container. As used herein, a test fluid is any fluid that can be monitored by a fluid-monitoring system and fluid container. A fluid-monitoring system and/or a fluid container can be adapted to test a wide range of different fluids.

Furthermore, the herein described concepts may be applied to virtually any fluid container, including, but not limited to, beakers, measuring cups, beer steins, tankards, flagons, chalices, goblets, coffee cups, mugs, sake cups, shot glasses, teacups, Collins glasses, highball glasses, pony glasses, dinner glasses, coolers, pilsner glasses, tumblers, champagne flutes, cocktail glasses, sherry glasses, wine glasses, snifters, bottles, cans, bowls, punch bowls, and pitchers.

Fluid container 12 includes a light-transmissive bottom 36 and a light guide 38. The light-transmissive bottom is configured to pass reference light to light guide 38. As such, at least a portion of the light-transmissive bottom is constructed so that reference light originating at light source 16 may enter light guide 38 before being reflected to sensor 18. In some embodiments, the light-transmissive bottom may be shaped so as to closely mate with surface 14, thus creating a substantially gap-free path for reference light travelling from surface 14 to light-transmissive bottom 36. As a nonlimiting example, the surface and the light-transmissive bottom may both be substantially flat. In some embodiments, the light-transmissive bottom may be constructed from a material that has an index of refraction that is similar to the index of refraction of the surface. It should be understood that the light-transmissive bottom may only account for a portion of the total bottom surface of the fluid container, and other portions of the bottom surface may be light absorbing and/or light reflecting.

Light guide 38 includes an end portion 40 and, in some embodiments, a guide section 42. When included, the guide section is located intermediate the light-transmissive bottom and the end portion. The guide section directs reference light between the light-transmissive bottom and the end portion. The guide section is designed to limit the amount of reference light that escapes between the light-transmissive bottom and the end portion. In some embodiments, guide section 42 may include an internally reflective surface that helps keep reference light from escaping. In some embodiments, the guide section may be constructed from a material that encourages total internal reflection of reference light traveling through the guide section.

The length of the guide section can be selected to place end portion 40 at a desired level within fluid-holding space 32. In some embodiments, the guide section can be substantially straight, as illustrated in FIG. 1. In other embodiments, the guide section can bend, twist, or otherwise deviate from a straight course. The course of the guide section may be selected to produce fluid containers with a functional shape and/or a pleasing aesthetic.

As can be seen in FIG. 1, end portion 40 of light guide 38 projects into fluid-holding space 32 of fluid container 12. In the illustrated embodiment, the end portion projects substantially vertically into the fluid-holding space. In other embodiments, the end portion may project substantially horizontally into the fluid-holding space, or project at a skewed angle into the fluid-holding space.

FIG. 2 shows a cross-sectional view of fluid container 12 holding two different amounts of liquid 34. On the left, liquid 34 is at a higher level 44 in the fluid container, and on the right, liquid 34 is at a lower level 46 in the fluid container.

As demonstrated on the left, end portion 40 of fluid container 12 is configured to pass reference light 26 to a test fluid (e.g., liquid 34) when the end portion is submerged in the test fluid. However, as demonstrated on the right, end portion 40 of fluid container 12 returns reference light 26 to light-transmissive bottom 36 when the end portion is not submerged in the test fluid (e.g., liquid 34). As such, the amount or pattern of reference light reflected by the fluid container changes as the fullness of the fluid container changes. The position, shape, and/or material of light guide 38 can be selected so that the amount or pattern of reference light that is returned to light-transmissive bottom 36 changes as a function of fluid container fullness.

End portion 40 may include two or more opposing reflection faces. As illustrated, the end portion includes reflection face 48 and reflection face 50. As can be seen in FIG. 1, end portion 40 has a conical shape. As used herein, "opposing reflection faces" includes opposing sides of a substantially continuous conic surface, or another substantially continuous surface. In general, "opposing reflection faces" can include virtually any two serially reflecting surfaces. In other embodiments, an end portion may have a pyramidal, dome, wedge, or other suitable shape.

In the illustrated embodiment, reflection face 48 and reflection face 50 are orientated at approximately a right angle relative to one another and at approximately a forty-five degree angle relative to an optical axis of the light guide (e.g., the direction light travels through the light guide). These angles are nonlimiting. The angle of the reflection faces relative to the optical axis can be selected so as to promote total internal reflection when the end portion of the light guide is not submerged, but to allow light to pass out of the light guide when the end portion is submerged. Light may encounter the reflection faces from a range of different angles, and the angle of the reflection faces can be selected accordingly to promote total internal reflection under desired submersion conditions.

Total internal reflection occurs when light encounters a boundary between different materials at an angle greater than a critical angle. When light does not encounter the boundary at an angle greater than the critical angle, the light will be partially refracted and partially reflected at the boundary. However, refraction will stop and all light will be internally reflected if the critical angle is exceeded. The ratio of the refractive index of the less dense medium compared to the refractive index of the denser medium determines the critical angle at the boundary between the different mediums.

The refractive index of the light guide may be greater than the refractive index of air, which is very close to 1.0. As a nonlimiting example, the light guide may be constructed from glass or polycarbonate, which are characterized by refractive indices of approximately 1.5 to 1.6. As such, the critical angle at the reflective face may be approximately thirty-nine degrees to forty-two degrees. Therefore, in such an embodiment, if reference light encounters the reflection face at greater than approximately thirty-nine to forty-two degrees, the reference light will be totally internally reflected. It should be understood that other materials may be used to construct the light guide, and such materials may result in a different critical angle.

The refractive index of the light guide may be closer to the refractive index of one or more different test fluids than to the refractive index of air. As such, when reference light traveling through the light guide encounters an end portion that is submerged in a test fluid with a similar refractive index, light may pass out of the light guide into the test fluid. For example, assuming a refractive index of 1.3 for the test fluid and a refractive index of 1.5 for the light guide, the critical angle is approximately sixty degrees. Therefore, the reference light will not be totally internally reflected unless it encounters the reflection face at an angle greater than sixty degrees. In the illustrated embodiment, the reference light encounters the reflection face at approximately forty five degrees. Accordingly, total internal reflection does not occur. Relatively more reference light escapes from the light guide when the light guide is submerged.

Reference light that is totally internally reflected at the end portion of the light guide may return through the light guide back to the light-transmissive bottom. As such, the reflected reference light may be measured by a sensor of the fluid-monitoring system. Furthermore, the relative amount or pattern of reference light reflected from the fluid container can be correlated with a relative fullness of the fluid container.

FIG. 3 shows a cross-sectional view of another fluid container 52 holding two different amounts of a liquid 54. On the left, liquid 54 is at a higher level 56 in the fluid container, and on the right, liquid 54 is at a lower level 58 in the fluid container.

Fluid container 52 includes a light-transmissive bottom 60 and a light guide 62. In the illustrated embodiment, light guide 62 travels outside of a fluid-holding space 64 of the fluid container. Further, light guide 62 bends so as to project an end portion 66 substantially horizontally into fluid-holding space 64 of the fluid container.

End portion 66 is configured to return reference light to light-transmissive bottom 60 when the end portion is not submerged in a test fluid (e.g., liquid 54). For example, as shown on the left, reference light 68 passes from end portion 66 when the end portion is submerged in liquid 54. However, as shown on the right, reference light 68 is totally internally reflected by end portion 66 when the end portion is not submerged in liquid 54. The reference light is illustrated as taking a curved path through light guide 62 for simplicity. It should be understood that the reference light may reflect off the interior faces of the light guide when travelling through the light guide.

A fluid container may include a plurality of different light guides. For example, FIG. 4 shows a cross-sectional view of a fluid container 70 that includes light guide 72 and light guide 74 projecting into fluid-holding space 76. Fluid container 70 is holding three different amounts of a liquid 78. On the left, liquid 78 is at a higher level 80 in the fluid container, in the middle, liquid 78 is at an intermediate level 82 in the fluid container, and on the right, liquid 78 is at a lower level 84 in the fluid container.

A light guide can be placed to monitor a particular fullness level of the fluid-holding space. If a usage scenario benefits from monitoring different levels, light guides can be calibrated to such levels. With added light guides, a fluid-monitoring system may more accurately monitor a relative fullness of a fluid container. For example, light guide 72 projects to a relatively high level, and light guide 74 projects to a relatively low level. As can be seen on the left, when light guide 72 and light guide 74 are both submerged, reference light 86 escapes both light guides into the test fluid (e.g. liquid 78). As shown in the middle, reference light 88 is reflected by light guide 72 when it is not submerged, but reference light 90 escapes light guide 74 because it remains submerged. As shown on the right, reference light 92 is reflected from both light guide 72 and light guide 74 when neither light guide is submerged. As such, fluid container 70 reflects at least three different amounts or patterns of reference light depending on a relative fullness of the fluid container.

It should be understood that while fluid container 70 is shown with two different light guides projecting to two different levels of the fluid-holding space, a fluid container may be constructed with virtually any number of different light guides.

Furthermore, the light guides can be positioned at locations other than those shown in the presented example embodiments. For example, one or more light guides may be positioned adjacent a sidewall of the fluid container or integrated into a sidewall of the fluid container. Furthermore, as shown in FIG. 3, one or more light guides may be positioned to project substantially horizontally into the fluid-holding space.

FIG. 5 shows a cross-sectional view of another fluid container 94 holding three different amounts of a liquid 95. Fluid container 94 includes a light-transmissive bottom 96 and a light guide 98 including an end portion 100. Light guide 98 is configured to vary a ratio of reference light returned to the light-transmissive bottom and reference light passed to the test fluid responsive to a change in a submersion level of the end portion in the test fluid. In other words, more reference light is returned to the light-transmissive bottom as the fluid container is emptied. As shown in FIG. 5, more of the light guide becomes exposed to air as the fluid container empties. Therefore, more reference light is totally internally reflected by the light guide as the fluid container is emptied. Accordingly, relatively more reference light is returned to light-transmissive bottom 96. This provides a somewhat analog measurement of a fullness of fluid container 94 throughout the range covered by end portion 100 of light guide 98. Such analog measurements may be possible with any light guide having an end portion that covers a range of different fluid levels within a fluid-holding space of a fluid container.

The herein described fluid containers may be constructed using conventional manufacturing techniques. The light guides can be molded or otherwise integrated into the fluid containers in any suitable manner. There need not be any moving parts or electronics, thus making the fluid containers inexpensive, durable, and compatible with standard washing and handling methods.

In some embodiments, a fluid container may include an identifier so that the fluid container can be identified by a fluid-monitoring system. As a nonlimiting example, a bottom surface of the fluid container may include a reflective identification-pattern.

FIG. 6 shows a light-transmissive bottom surface 102 of a fluid container 104. Fluid container 104 includes a light guide 106 configured to return reference light to the light-transmissive bottom when the light guide is not submerged in a test fluid. The fluid container also includes a nonlimiting example of a reflective identification-pattern 108. In the illustrated embodiment, reflective identification-pattern 108 includes a pattern of thirty-two hexagonal markers. Each marker can be configured for either high or low reflectivity. For purposes of illustration, high reflectivity is indicated by white hexagonal markers and low reflectivity is indicated by black hexagonal markers. FIG. 7 shows a different fluid container 110 that includes a different reflective identification pattern 112. In some embodiments, one or more of the markers with relatively high reflectance may be configured with high retro-reflectivity.

A sensor of a fluid-monitoring system can recognize an identification-pattern of reference light reflected from the bottom surface of a fluid container. An analysis subsystem of the fluid-monitoring system can analyze the identification-pattern to identify a particular fluid container and/or distinguish a particular fluid container from other fluid containers. For example, embodiments of a fluid-monitoring system that include a processing subsystem may include computer-readable media including instructions that, when executed by the processing subsystem, identify a fluid container by analyzing a reflective identification-pattern of the fluid container.

In the illustrated embodiments, the reflective identification-pattern includes thirty-two different markers, each of which can be configured with high or low retro-reflectivity. In other words, there are $2^{32}$ (i.e., 4,294,967,296) different possible reflective identification-patterns using the illustrated arrangement. FIGS. 6 and 7 show just two of the 4,294,967,296 different reflective patterns that can be created by changing the retro-reflectivity of the individual hexagonal markers.

It should be understood that the illustrated identification patterns are nonlimiting examples. Other identification patterns may use fewer or more markers, markers having different shapes and/or sizes, and/or markers in different patterns. In some embodiments, one or more markers may be positioned so as to establish an orientation of the other markers. A reflective-identification pattern can be pattern matched and correlated to a fluid container using a lookup table. Additionally or alternatively, at least some of the markers may represent a digit in a binary number, and the monitored reflections at each marker can be used to set a digit corresponding to a marker to either 0 or 1. Virtually any identification pattern that is distinguishable by a sensor of the fluid-monitoring system can be used. Furthermore, a fluid container may be identified using other techniques. For example, a shape of a bottom surface of a fluid container can be used to identify that fluid container.

As described above, a fluid monitoring system can be used to monitor a fluid level of a fluid container. This ability can be used in a variety of different usage environments. As a nonlimiting example, a fluid-monitoring system can be used by a bar or restaurant to help monitor the drinking progress of one or more guests.

Drink sales are an important aspect of the hospitality business and often account for a large fraction of profits. In addition, guest perception of service is largely driven by the timing at which drink refills are offered. Prompt service not only increases a guest's desire to return, it also may allow for extra table turns. Bars and restaurants will often train staff to watch for the right moment to offer a refill. If a refill is offered too early, a guest may feel unnecessarily pestered. Waiting until the guest has finished a drink may allow the guest to enter the mindset that the time for drinking has passed. Well trained staff strive to wait until a drink is almost, but not completely, finished in order to increase the probability of a refill order. However, it is very difficult for even the most well trained staff to monitor the drinking progress of all guests at all times.

The herein described fluid-monitoring system allows a bar or restaurant to automatically offer refills to a guest when the guest is almost finished with a beverage. The bar or restaurant may further automatically adjust the guest experience based on drink consumption levels. For example, variables such as background music, temperature, and/or offers of other products and/or services can be tailored to the monitored drinking progress of one or more guests.

A fluid-monitoring system that includes a display surface can be used to provide an intuitive interface for ordering food and drinks, while also serving as the physical table upon which these items are placed. During a visit, the fluid-monitoring system can be used to entertain guests or provide other services, including advertising and shopping. The fluid-monitoring system may also track the drinking progress of the guests, and automatically offer drink refills when appropriate, or alert wait staff that it is the appropriate time to offer a refill.

As a nonlimiting example, a bar may determine that its guests appreciate refill offers when there is one inch of beer left in a pint glass. As such, the bar may utilize pint glasses with light guides that project into the fluid-holding space of the pint glass at a predetermined drink-refill level. For example, if the bar wishes to know when one inch of beer is left, the bar may set a height of the light guide at approximately one inch. In this way, the light guide changes the overall reflectance of the pint glass when beer falls below the one inch level. A fluid-monitoring system can monitor the fullness of the pint glass and generate a drink-refill message responsive to the relative fullness of the fluid container dropping below a predetermined drink-refill level (e.g., one inch). The fluid-monitoring system may include instructions for generating such a message.

Figure 8:
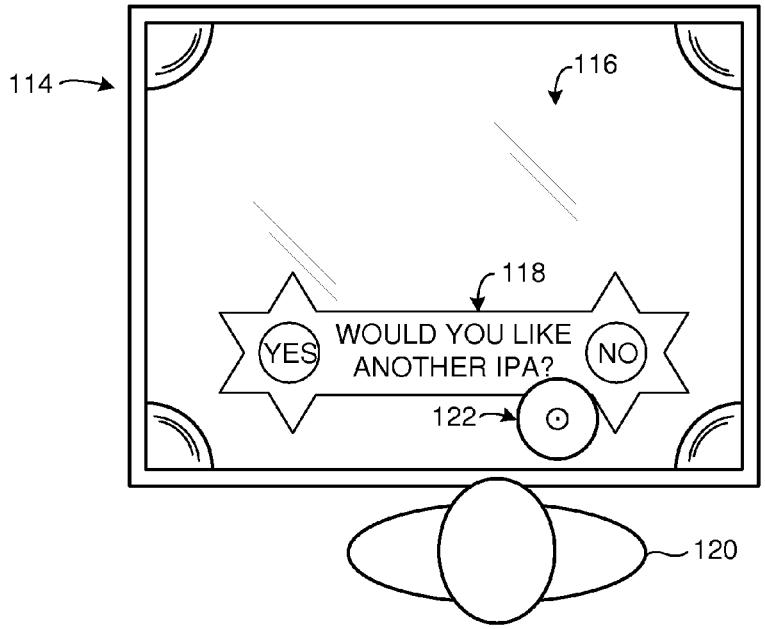
FIG. 8 shows a fluid-monitoring system presenting a drink-refill message to a guest in accordance with an embodiment of the present disclosure.

FIG. 8 shows a nonlimiting example of a fluid-monitoring system 114 causing a display surface 116 to present a drink-refill message 118 to a guest 120. Guest 120 is drinking from a fluid container 122 in the form of a pint glass. The fluid-monitoring system has recognized that a relative fullness of the pint glass has dropped below a predetermined drink refill level because the pint glass is reflecting a relatively high amount of reference light. As such, the fluid-monitoring system is able to promptly ask the guest if a refill is desired, thus providing the guest with excellent service. If the guest desires another drink, the guest can use the touch-screen capabilities of the fluid-monitoring system to order another drink.

Figure 9:
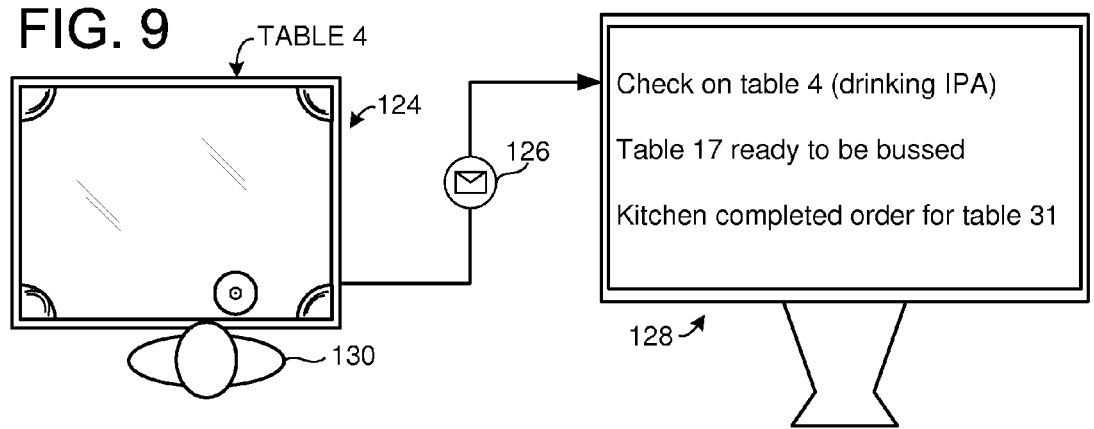
FIG. 9 shows a fluid-monitoring system sending a drink-refill message to a computer in accordance with an embodiment of the present disclosure.

In some scenarios, it may be more appropriate to give a guest face-to-face service. As such, a fluid-monitoring system may include instructions that cause a communication subsystem to send a drink-refill message to a message recipient. For example, FIG. 9 shows fluid-monitoring system 124 sending a drink-refill message 126 to a wait staff coordination computer 128. Such a message can alert wait staff that a guest 130 at table 4 is almost ready to finish a beverage and may desire another beverage. The wait staff coordination computer additionally may be configured to display a textual and/or graphical representation of the drink-status of a plurality of different beverages throughout an establishment.

In some embodiments, a wait staff coordination computer can be used to keep track of wait staff performance, sales trends, and/or other metrics. Such data can be used to determine, among other things, how service responsiveness, locations of tables, times of day, food and drink specials, and/or other factors affect drink sales.

As another example, a waiter may carry a communicator that receives drink-refill messages, thus providing the waiter with notifications when a guest may desire another beverage. As still another example, the fluid-monitoring system may display a discrete drink-refill message on a display surface, thus providing subtle notification to the wait staff that the guest may be ready for another beverage.

Figure 10:
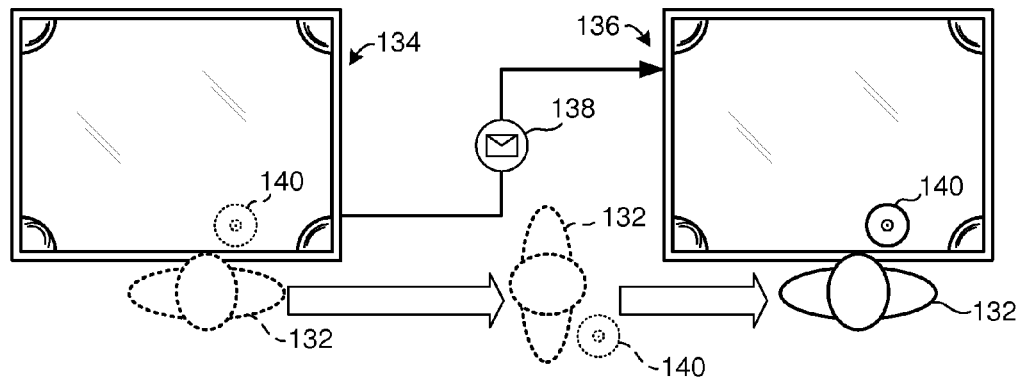
FIG. 10 shows a fluid-monitoring system sending a drink-identification message to another fluid-monitoring system in accordance with an embodiment of the present disclosure.

The fluid-monitoring system may send other types of messages to a variety of different message recipients. For example, a fluid-monitoring system may include instructions that cause a communication subsystem to send a drink-identifier message to another fluid-monitoring system and/or to a wait staff coordination computer. For Example, FIG. 10 shows a guest 132 moving from a first fluid-monitoring system 134 to a second fluid-monitoring system 136. The first fluid-monitoring system sends a drink-identification message 138 to at least the second fluid-monitoring system. In this way, when guest 132 places a fluid container 140 on the second fluid-monitoring system, the second fluid-monitoring system can identify the fluid container and obtain information about the fluid container, information about the contents of the fluid container, or information about the guest from the first fluid-monitoring system or from a central repository.

Figure 11:
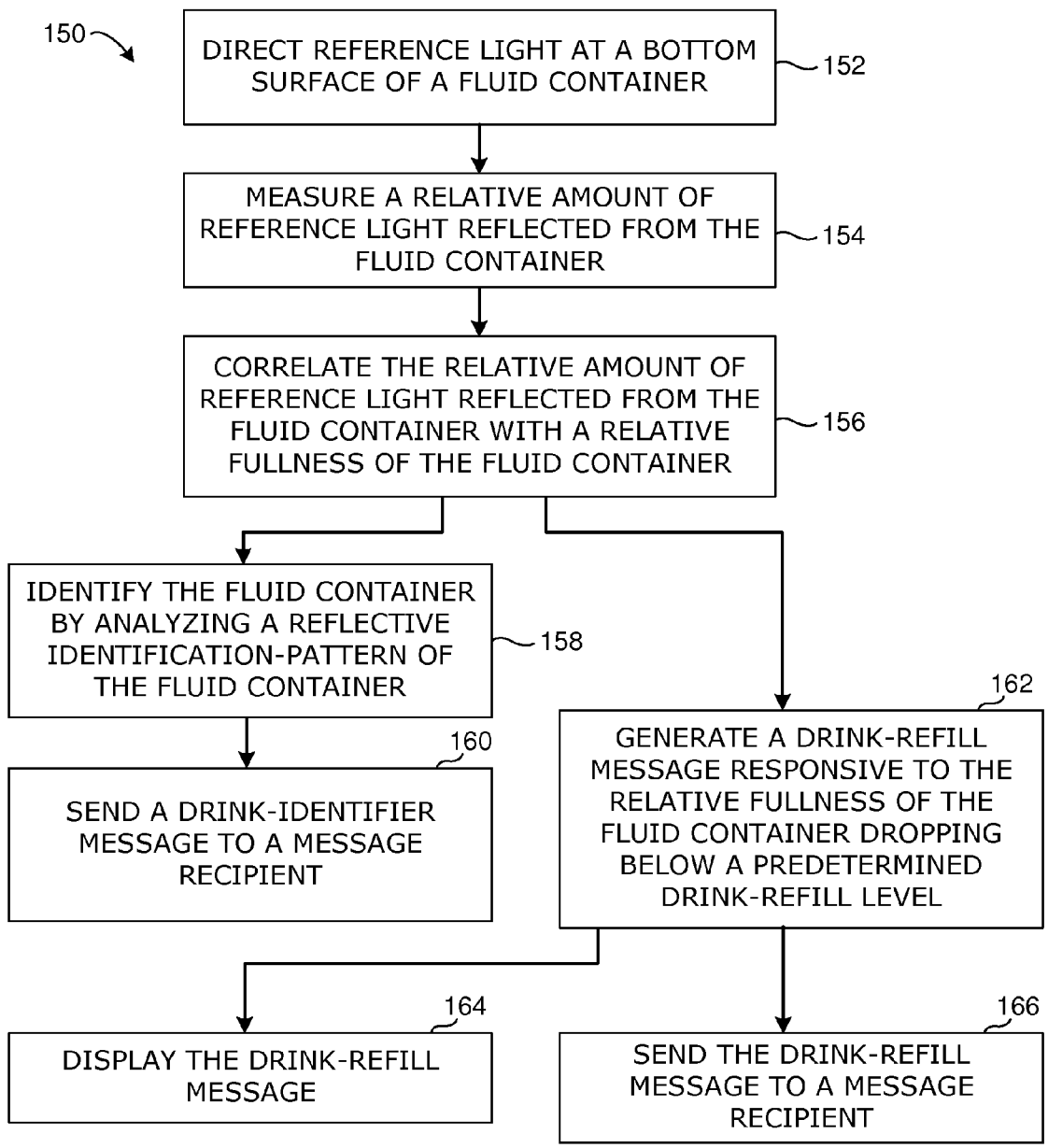
FIG. 11 shows a process flow of an example method of optically monitoring a relative fullness of a fluid container.

FIG. 11 shows a process flow 150 of an example method of optically monitoring a fullness of a fluid container. At 152, the method includes directing reference light at a bottom surface of the fluid container. At 154, the method includes measuring a relative amount or pattern of reference light reflected from the fluid container. At 156, the method includes correlating the relative amount or pattern of reference light reflected from the fluid container with a relative fullness of the fluid container.

The method may optionally include, at 158, identifying the fluid container by analyzing a reflective identification-pattern of the fluid container. If identified, the method may further include, at 160, sending a drink-identifier message to a message recipient.

The method may optionally include, at 162, generating a drink-refill message responsive to the relative fullness of the fluid container dropping below a predetermined drink-refill level. At 164, the drink-refill message can optionally be displayed. At 166, the drink-refill message can optionally be sent to a message recipient.

Figure 12:
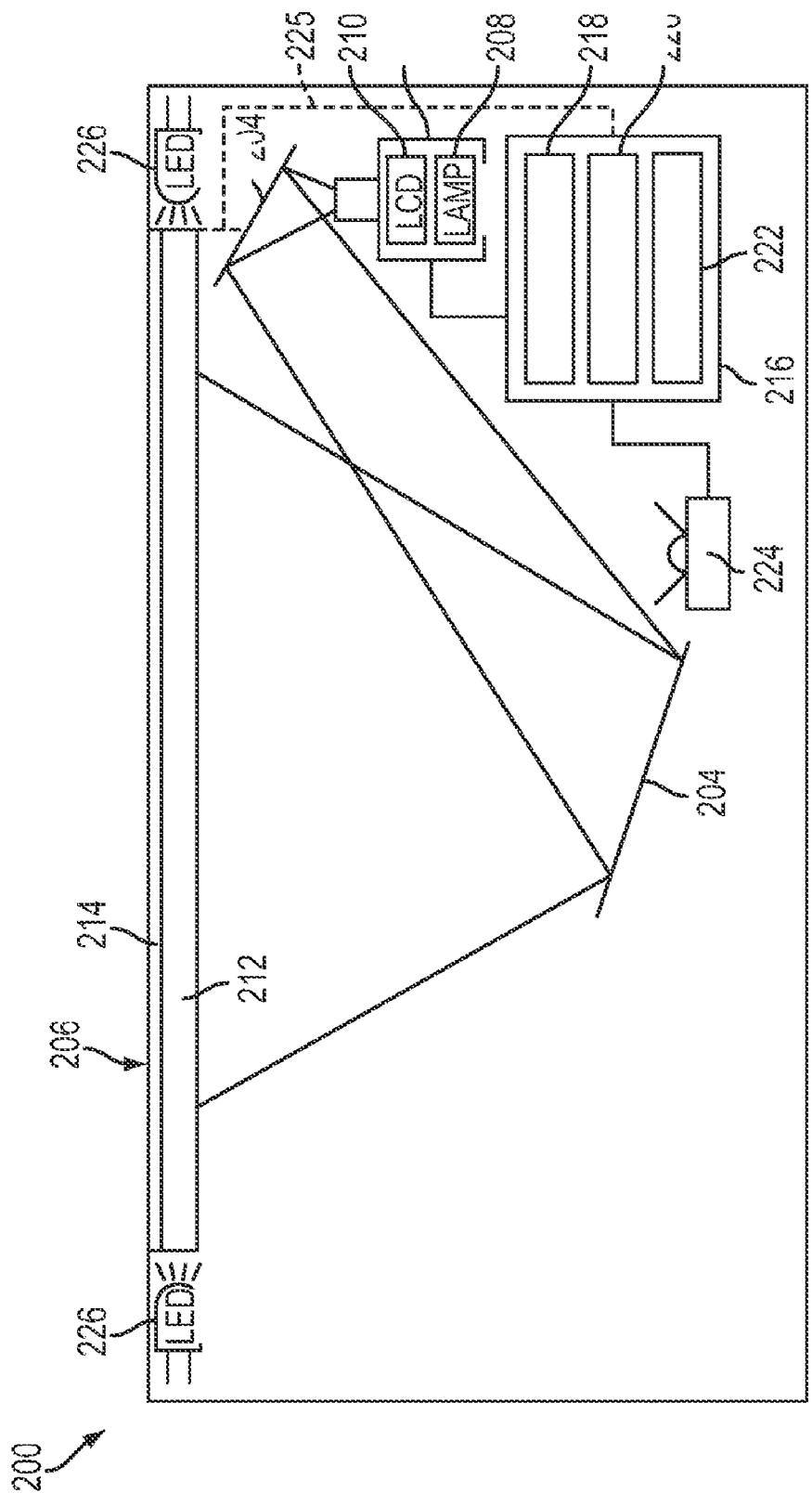
FIG. 12 shows a surface computing device capable of monitoring a relative fullness of a fluid container in accordance with an embodiment of the present disclosure.
Figure 13:
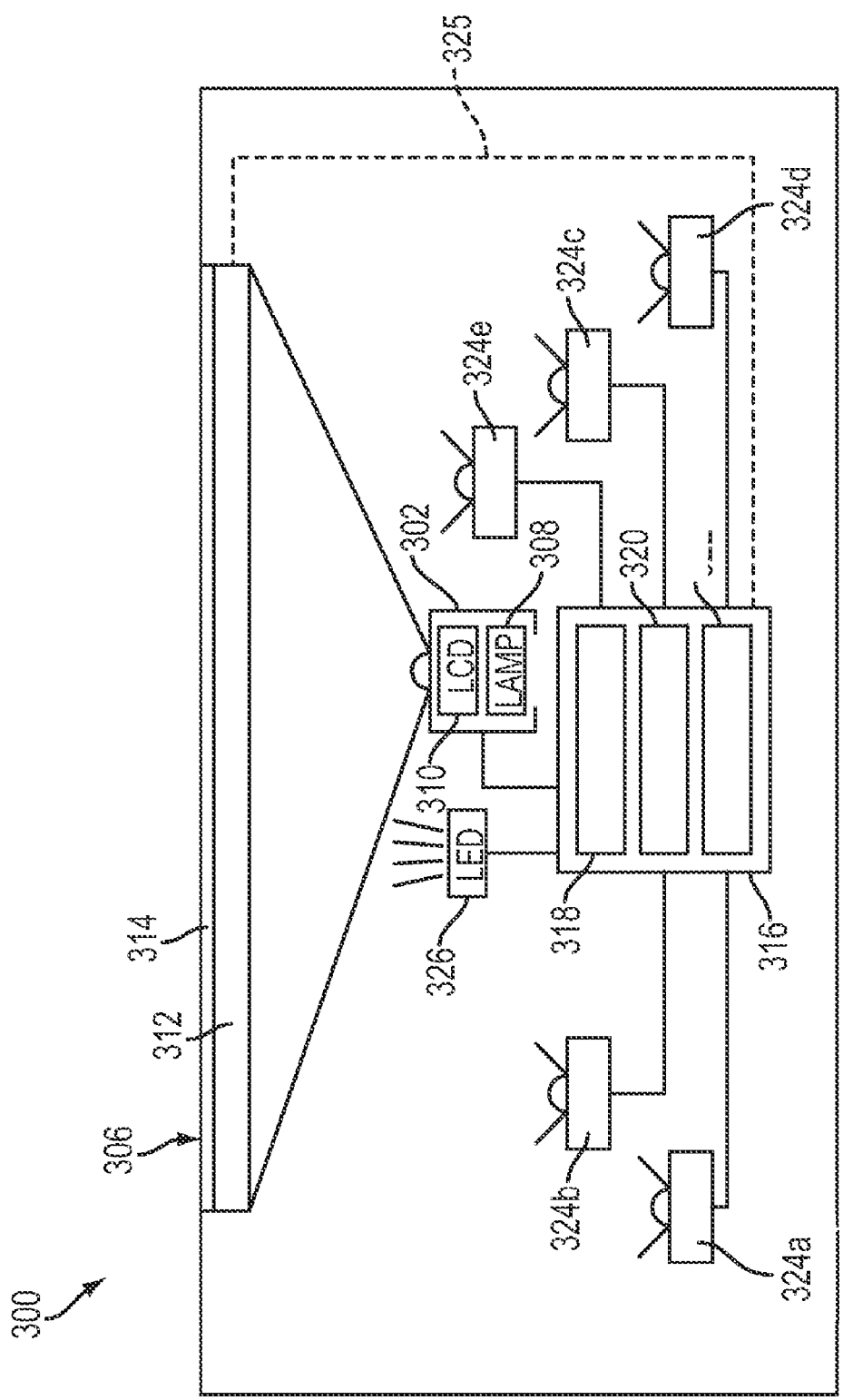
FIG. 13 shows another surface computing device capable of monitoring a relative fullness of a fluid container in accordance with an embodiment of the present disclosure.

A variety of different devices can serve as a fluid-monitoring system. A surface computing device is a nonlimiting example of such a device. FIGS. 12 and 13 show nonlimiting examples of surface computing devices capable of optically monitoring the relative fullness of one or more fluid containers.

FIG. 12 shows a schematic depiction of an embodiment of a surface computing device 200 utilizing an optical touch sensing mechanism. Surface computing device 200 comprises a projection display system having an image-generation subsystem 202, optionally one or more mirrors 204 for increasing an optical path length and image size of the projection display, and a display screen 206 onto which images are projected.

Image-generation subsystem 202 includes an optical or light source 208 such as the depicted lamp, an LED array, or other suitable light source. Image-generation subsystem 202 also includes an image-producing element 210 such as the depicted LCD (liquid crystal display), an LCOS (liquid crystal on silicon) display, a DLP (digital light processing) display, or any other suitable image-producing element. Display screen 206 includes a clear, transparent portion 212, such as a sheet of glass, and a diffuser screen layer 214 disposed on top of the clear, transparent portion 212. In some embodiments, an additional transparent layer (not shown) may be disposed over diffuser screen layer 214 to provide a smooth look and feel to the display surface. The display screen can serve as a surface for supporting one or more fluid containers.

Continuing with FIG. 12, surface computing device 200 further includes an analysis subsystem 216 comprising computer-readable media 218 and a processing subsystem 220. Further, surface computing device 200 may include a communication subsystem 222 configured to conduct one-way or two-way communication with other devices. Communication subsystem 222 may be configured to conduct wired or wireless communications with other device in any suitable manner.

To sense objects placed on display screen 206, surface computing device 200 includes an image capture device 224 configured to capture an image of the entire backside of display screen 206, and to provide the image to analysis subsystem 216 for the detection of objects appearing in the image. Diffuser screen layer 214 helps to avoid the imaging of objects that are not in contact with or positioned within a few millimeters of display screen 206, and therefore helps to ensure that only objects that are touching display screen 206 are detected by image capture device 224.

Image capture device 224 may include any suitable image sensing mechanism. Examples of suitable image sensing mechanisms include but are not limited to CCD and CMOS image sensors. Further, the image sensing mechanisms may capture images of display screen 206 at a sufficient frequency to detect motion of an object across display screen 206. Display screen 206 may alternatively or further include an optional capacitive, resistive or other electromagnetic touch-sensing mechanism, as illustrated by dashed-line connection 225 of screen 206 with analysis subsystem 216.

Image capture device 224 may be configured to detect reflected or emitted energy of any suitable wavelength, including but not limited to infrared and visible wavelengths. To assist in detecting objects placed on display screen 206, image capture device 224 may further include an additional optical source or emitter such as one or more light emitting diodes (LEDs) configured to produce infrared or visible light. Light from LEDs 226 may be reflected by objects placed on display screen 206 and then detected by image capture device 224. The use of infrared LEDs as opposed to visible LEDs may help to avoid washing out the appearance of projected images on display screen 206.

LEDs 226 may be positioned at any suitable location within surface computing device 200. In the depicted embodiment, a plurality of LEDs 226 are placed along a side of display screen 206. In this location, light from the LEDs can travel through display screen 206 via internal reflection, while some can escape from display screen 206 for reflection by an object on the display screen 206. In alternative embodiments, one or more LEDs may be placed beneath display screen 206 so as to pass emitted light through display screen 206.

LEDs 226 can be used to direct reference light at a bottom side of a fluid container, and image capture device 224 can measure a relative amount or pattern of reference light reflected from the fluid container. In this way, a relative fullness of the fluid container can be optically monitored.

FIG. 13 shows a schematic depiction of another embodiment of a surface computing device 300 that utilizes an optical touch sensing mechanism. Surface computing device 300 comprises a projection display system having a wide-angle image-generation subsystem 302 and a display screen 306 onto which images are projected. Image-generation subsystem 302 includes a light source 308 and an image-producing element 310. Display screen 306 includes a transparent glass structure 312 and a diffuser screen layer 314 disposed thereon. Display screen 306 may serve as a surface for supporting one or more fluid containers.

Continuing with FIG. 13, surface computing device 300 includes an analysis subsystem 316 comprising computer readable media 318 and processing subsystem 320. Further, surface computing device 300 includes a communication subsystem 322 configured to conduct one-way or two-way communication with other devices.

Surface computing device 300 further includes a plurality of image capture devices, depicted as 324a-324e, and an optical emitter such as an LED array 326 configured to illuminate a backside of display screen 306 with infrared or visible light. Image capture devices 324a-324e are each configured to capture an image of a portion of display screen 306 and provide the image to analysis subsystem 316, and to assemble a composite image of the entire display screen 306 from the images. In the depicted embodiment, image capture devices 324a-324d are positioned generally beneath the corners of display screen 306, while image capture device 324e is positioned in a location such that it does not pick up glare from LED array 326 reflected by display screen 306 that may be picked up by image capture devices 324a-324d. In this manner, images from image capture devices 324a-324e may be combined by analysis subsystem 316 to produce a complete, glare-free image of the backside of display screen 306. This allows detection of an object such as a fluid container placed on display screen 306. Display screen 306 may alternatively or further include an optional capacitive, resistive or other electromagnetic touch-sensing mechanism, as illustrated by dashed-line connection 325 of screen 306 with analysis subsystem 316.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, surface computing devices, personal computers, servers, laptop computers, hand-held devices, microprocessor-based programmable consumer electronics and/or appliances, etc.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A fluid-monitoring system, comprising:
   a surface orientated to support a fluid container;
   a light source positioned to direct reference light through the surface to the fluid container;
   a sensor operatively positioned to detect reference light reflected from the fluid container and back through the surface; and
   an analysis subsystem to determine a relative fullness of the fluid container by analyzing a relative amount or pattern of reference light reflected from the fluid container.

2. The fluid-monitoring system of claim 1, wherein the analysis subsystem includes a processing subsystem and computer-readable media including instructions that, when executed by the processing subsystem, correlate a relative amount or pattern of reference light reflected from the fluid container with a relative fullness of the fluid container.

3. The fluid-monitoring system of claim 2, wherein the computer-readable media further include instructions that, when executed by the processing subsystem, generate a drink-refill message responsive to the relative fullness of the fluid container dropping below a predetermined drink-refill level.

4. The fluid-monitoring system of claim 3, wherein the surface is a display surface, and wherein the computer-readable media further include instructions that, when executed by the processing subsystem, cause the display surface to present the drink-refill message.

5. The fluid-monitoring system of claim 3, further comprising a communication subsystem, wherein the computer-readable media further include instructions that, when executed by the processing subsystem, cause the communication subsystem to send the drink-refill message to a message recipient.

6. The fluid-monitoring system of claim 2, wherein the computer-readable media further include instructions that, when executed by the processing subsystem, identify the fluid container by analyzing a reflective identification-pattern of the fluid container.

7. The fluid-monitoring system of claim 6, further comprising a communication subsystem, wherein the computer-readable media further include instructions that, when executed by the processing subsystem, cause the communication subsystem to send a drink-identifier message to a message recipient.

8. A method of optically monitoring an amount of fluid in a fluid container, the method comprising:
   directing reference light at a bottom surface of the fluid container;
   determining a relative amount or pattern of reference light reflected from the fluid container;
   determining a relative fullness of the fluid container based on the relative amount or pattern of reference light reflected from the fluid container; and
   generating a message if the amount of fluid in the fluid container drops below a predetermined level.

9. The method of claim 8, wherein reference light is directed at the bottom surface of the fluid container through a surface supporting the fluid container.

10. The method of claim 8, further comprising identifying the fluid container by analyzing an identification-pattern of reference light reflecting from the bottom surface of the fluid container.

11. A fluid container defining a fluid-holding space, the fluid container comprising:
    a light-transmissive bottom; and
    a light guide including an end portion projecting into the fluid-holding space, the light-transmissive bottom being configured to pass reference light to the end portion of the light guide, and the end portion of the light guide being configured to return the reference light to the light-transmissive bottom when the end portion is not submerged in a test fluid and to pass the reference light to a test fluid when the end portion is submerged in a test fluid.

12. The fluid container of claim 11, wherein the light guide further includes a guide section intermediate the light-transmissive bottom and the end portion, the guide section being configured to direct reference light between the light-transmissive bottom and the end portion.

13. The fluid container of claim 12, wherein the guide section is configured to totally internally reflect light traveling through the guide section.

14. The fluid container of claim 11, wherein the end portion of the light guide includes two or more opposing reflection faces that totally internally reflect the reference light when the end portion is not submerged in a test fluid.

15. The fluid container of claim 11, wherein the end portion projects substantially vertically into the fluid-holding space.

16. The fluid container of claim 11, wherein the end portion projects substantially horizontally into the fluid-holding space.

17. The fluid container of claim 11, wherein the light-transmissive bottom includes a reflective identification-pattern.

18. The fluid container of claim 11, wherein the end portion projects into the fluid-holding space to a predetermined drink-refill level.

19. The fluid container of claim 11, wherein the light guide is one of a plurality of different light guides, each different light guide including an end portion projecting to a different level of the fluid-holding space.

20. The fluid container of claim 11, wherein the end portion of the light guide is configured to vary a ratio of reference light returned to the light-transmissive bottom and reference light passed to the test fluid responsive to a change in a submersion level of the end portion in the test fluid.

* * * * *